Patented June 12, 1928.

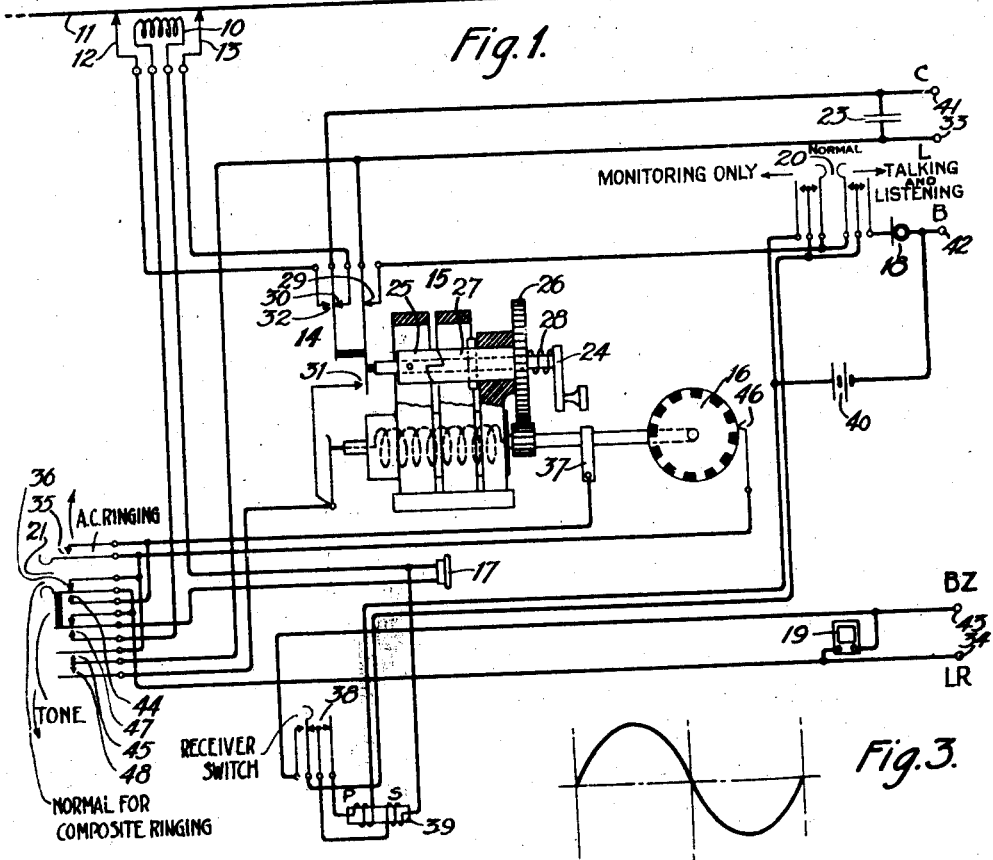

1,672,933

UNITED STATES PATENT OFFICE.

WILLIAM H. EDWARDS, OF BROOKLYN, NEW YORK, AND ELIOT W. NILES, OF NEWARK, NEW JERSEY, ASSIGNORS TO AMERICAN TELEPHONE AND TELEGRAPH COMPANY, A CORPORATION OF NEW YORK.

LINEMAN'S TEST SET.

Application filed January 7, 1926. Serial No. 79,879.

This invention relates to methods and means for locating faults in line conductors and more particularly to various improvements in the arrangement of the circuits and apparatus as assembled in a portable testing set, for use by a lineman, disclosed in a copending application of Oscar A. Shann, Serial No. 45,786, filed July 24, 1925.

In the testing circuit arrangement according to the above mentioned system, there is provided means for detecting faults in conductors such as shorts, grounds and crosses, and means whereby the direction of a fault on the conductor relative to the position of a lineman may be ascertained without shifting the testing set, that is, without changing the position of the associated exploring coil after it has once been secured to the conductor. To this end a manual switching arrangement was provided whereby the testing current was supplied to the conductor at one side or the other of the exploring coil and an ordinary hand generator and an interrupter was used for the production of the alternating current tone used for testing purposes.

An object of this invention is to simplify the means for locating the direction of faults of the above mentioned type in conductors relative to the position of the testing set and to secure greater audibility of the alternating current tones used for testing purposes.

To attain this and other objects of the invention, there is provided in accordance with one feature thereof an improved circuit switching arrangement incorporated in and operated by an alternating current hand generator whereby, when the generator is operated in one direction, testing tone is transmitted to the conductor under test at one side of the exploring coil and when the generator is operated in the opposite direction this testing tone is transmitted to the conductor under test at the opposite end of the exploring coil. This arrangement, therefore, eliminates the manual switching arrangement for transmitting testing tone to one side or the other of the exploring coil as provided by the circuit arrangement disclosed in the above mentioned copending application. That is, the testing tone is supplied automatically to the conductor to one side or the other of the exploring coil by merely operating the generator in one direction or the other.

Another feature of the invention is the provision of a condenser and current interrupter in the circuit from the generator. The interrupter short circuits the generator periodically thereby permitting the condenser charged by the generator current to discharge at frequent intervals during each half wave. This creates in the conductor under test an alternating current of a special wave pattern that produces a tone more easily detected in the conductor. This testing tone comprises an alternating current of comparatively high frequency that may be looked upon as modulated in accordance with the wave form produced by an ordinary hand generator. Or, more correctly stated, this alternating current is a modulated audio-frequency current in which the instantaneous current value of the wave changes abruptly and particularly may the change in instantaneous current value take place abruptly during the discharge of the condenser.

Referring now to the drawings, Figure 1 represents a circuit arrangement of a testing set for performing tests in accordance with the invention disclosed in the above mentioned copending application showing the improvements in the circuit arrangement as provided by this invention:

Fig. 2 represents a detail of construction in accordance with this invention incorporated in an ordinary generator for producing alternating current for testing purposes.

Fig. 3 represents an alternating current wave form of the type produced by an ordinary generator;

Fig. 4 represents an alternating current wave form of the type produced by an ordinary generator interrupted in accordance with the scheme shown in the Patent No. 1,384,734, issued July 19, 1921 to C. A. Anderson; and Fig. 5 represents an alternating current wave of the form produced by the circuit arrangement in accordance with this invention.

Considering now the principal features of this testing set as improved in accordance with this invention, 10 represents the usual exploring coil that is placed in close proximity with a line, such as 11, to be tested, while 12 and 13 represent contact members that form part of the exploring coil structure. The contact members 12 and 13 are adapted to hold the exploring coil 10 in proximity with the conductor 11 and also make electrical contact therewith for the transmission of the testing tone current to the conductor at either side of the coil, as will hereinafter be described. 14 is the switching spring arrangement adapted to be actuated by the generator 15 to determine in which direction the fault lies with respect to the position of the exploring coil and the generator 15 is, of course, provided for the purpose of producing the required alternating current to be used in this circuit, while 16 represents an interrupting device for the interrupting of this current. 17 is a receiver and 18 is a transmitter, while 19 is a buzzer to enable the lineman to be called by a central office and for other purposes as will hereinafter be described. Key 20 is provided for listening or so called monitoring to disconnect the set and turn off the talking current from the transmitter and for talking and listening. Key 21 is provided for controlling the generator, that is, for low frequency ringing (usually 16 cycles) on non-composited lines, for high frequency ringing (usually 133 cycles) on composited lines and for the fault locating as will hereinafter be described. 23 is a condenser which may be used in conjunction with the generator 15 and interrupter 16 to aid in the production of the particular type of improved testing tone current, for fault locating purposes, in accordance with this invention as will hereinafter be more fully described.

The generator 15 is of the usual type employed for producing alternating current for ringing purposes, except that instead of having the usual arrangement for closing contacts on the operation of the crank shaft in either direction, this generator is arranged to actuate contacts only on the operation of the crank shaft in one direction. To this end, the crank shaft 24 is provided with a collar 25 secured thereto and the cranking gear 26 is provided with a similar collar 27 secured thereto, while the shaft 24 is rotatably mounted and longitudinally movable in the bearing provided by the collar 27. Each of these collars has its end adjacent the other, cut to form a single tooth, as shown in Fig. 2 with one tooth engaging the other, as shown in Fig. 1, and normally locked together by the spring 28 inserted between the crank lever and the gear 26. In this manner, when the crank shaft 24 is operated in a clockwise direction it will be shifted for a short distance toward its left as the tooth on collar 25 rides up on the tooth on collar 27 and this shaft is thus caused to operate to open contacts 29 and 30 and close contacts 31 and 32 and the rotation thereof to operate the generator for the production of alternating current. On the other hand, if the crank shaft is rotated in a counter-clockwise direction, it will not move in a longitudinal direction but remains in its normal relation to the gear 26 as the teeth on collars 25 and 27 will be closed together and the generator will be driven in the opposite direction to produce alternating current.

Some of the various uses to which this testing set may be put will now be described. In general, this testing arrangement provides for ringing, talking and listening over non-composited and composited lines; for monitoring on the line to ascertain if the line is in use before actually bridging the set across the line; means whereby the lineman may be called without establishing a talking and listening circuit in the testing set; means for sounding the buzzer on tests for continuity of line conductors and particularly for locating the direction of faults relative to the position of the exploring coil as arranged in accordance with the features of this invention hereinbefore mentioned.

Assume now, that the lineman desires to communicate with a central office, for example with his wire chief to receive instructions as to lines on which troubles have been located. To this end, he will first connect terminals 33 and 34 to the conductors of an available line in the well-known manner employed by linemen in the field. These terminals will be used only for non-composited lines and the function of the system in connection with a line of this type will now be described. After connection has been made the lineman to ring the central office over this line first, operates key 21 to close springs 35 thereof and then operates the generator 15 in a direction to close the contacts 31 thereof. An alternating ringing current will now be transmitted over the line through the following circuit: From the generator through the contacts 31, terminal 33, over the line, back to the terminal 34, normally closed contacts 36 and contacts 35 of key 21, and back to the generator through brush 37. After this signal has been sent the lineman will operate his key 20 towards the right to close the right-hand contacts thereof. A talking and listening circuit will now be completed as follows: From the line through terminal 33, the normally closed contacts 29 of generator 15, right hand closed contacts of key 20, normally closed contacts of a receiver switch 38, secondary winding of induction coil 39, through the receiver 17, normally closed contacts of key 21, to terminal 34, back over the line. A circuit for the transmitter will also be closed through the right-hand contacts of key 20, through the transmitter 18, battery 40, through the primary winding of induction coil 39 and the normally closed contacts of switch 38. The operating of key 20 in this manner will therefore establish an ordinary talking and listening telephone circuit over which the lineman may carry on a conversation with the central office.

If desired, the set may be used for signaling over composited lines. In this case the conductors of the composited line are connected to the test set to terminals 41 and 34. The talking and listening circuit in this case will be identical with the circuit previously traced for a connection through a non-composited line except that the condenser 23 is included in series with the circuit to the central office and the key 21 should not in this case be operated to close contacts 35 so that the ringing current will in this instance be in the form of impulses of alternating current as produced by the interrupter 16, that is, the current produced by the generator 15 will instead of passing through the contacts 35 now pass through the interrupter 16 and the brush 46 thereof.

If the lineman desires to merely listen over the connected line which is called "to monitor," he will operate key 20 towards the left and thus eliminate the transmitter circuit. A circuit under these circumstances may be traced from the line through the terminal 41, condenser 23, normally closed contacts 29 of generator 15, left hand contacts of key 20, normally closed contacts of switch 38, secondary winding of induction coil 39, receiver 17, a pair of normally closed contacts of key 21, through terminal 34 to the line. Another circuit for making battery continuity tests would be the same except that the line would be connected to terminals 42 and 34 instead to eliminate the condenser and include the battery 40.

If it is necessary for the lineman to wait for a buzzer signal from the central office, he will connect his set to a line through terminals 43 and 34 for non-composited lines and 41 and 34 for composited lines. With the receiver in its holder (not shown) the receiver switch 38 closes its back contacts and the following circuit is provided: From a central office, over the connected line to terminal 34, buzzer 19, back contacts of switch 38, key 20 in position "monitoring only," to contacts 39, terminal 33 for non-composited lines or through condenser 23 to terminal 41 for composited lines to the other side of the line and back to the central office.

If the lineman desires to make a buzzer continuity test a line may be connected through terminals 33 and 43. In this case the circuit may be traced as follows: From the line through terminal 43, buzzer 19, a pair of normally closed contacts of key 21, brush 17, generator 15, contacts 31 to terminal 33 and the line.

Consider now the means for locating a fault and detect the direction thereof on a certain conductor or pair of conductors. The approximate location of a fault is determined by test from the central office in the manner well known in the art and this location made known to the lineman. The lineman then proceeds to a convenient point near the determined location and tests for the direction of the fault in relation to this point. To this end the exploring coil 10 is employed and placed as shown in Fig. 1 in close proximity to the conductor 11 on which it is assumed the trouble has been located while the contact members 12 and 13 are electrically connected to the conductor 11. A device showing an exploring coil such as 10 and contact members, such as 12 and 13, has been fully described in the copending application by Oscar A. Shann. Depending now on whether the conductor 11 has been grounded, or short-circuited with the other conductor in the pair of which 11 is one of the conductors, or if the conductor 11 of this pair is crossed with a conductor in an adjacent pair, the terminal 34 is in the first instant connected to ground in the second instant connected to the other conductor of this pair and in the third instant connected to the conductor with which it is crossed in the other pair. To test this conductor for the location of a ground the lineman will connect the terminal 34 to ground, operate his key 21 downward, hold the receiver to his ear, and operate the generator 15, first in one direction and then the other to test if the ground is located on one side or the other of the exploring coil. Assuming that he first operates the generator in a clockwise direction and thus causes the closing of contacts 31 and 32 and thereby establishes a circuit to the grounded fault on the conductor 11 from the ground on the terminal 34 as follows: Terminal 34, closed contacts 44, brush 37, from there through the generator to closed contacts 31, condenser 23, closed contacts 32, contact member 12, over the conductor 11 to ground, and also a short circuit for the generator through the interrupter 16 as follows: From ground previously traced through to brush 37, interrupter 16, brush 46, when it rests on a live segment of the interrupter, through closed contacts 45 and 48 to the contact 31. In this manner a tone, of uniformly pulsating alternating current of a comparatively high audio frequency more closely analyzed later in the description, will be produced for transmission over the conductor.

If the ground is located on the conductor on the left side of the exploring coil 10, no tone will be heard in the receiver 17 as there will be no induced current in the exploring coil due to the fact that the conductor from the point where the contact member 12 is attached towards the right has no current and the lineman will therefore know that the ground is not located at the right of the exploring coil. However, to make sure that the ground is actually located on the left of the exploring coil, the lineman will now operate the generator in the opposite direction, that is, in a counter-clockwise direction. This will open the contacts 32 and 31 and close the contacts 29 and 30. The tone will now travel over the conductor through the contacts 30 and the contact member 13 and consequently pass the portion immediately above the exploring coil. An induced tone will now therefore be heard by the lineman in the receiver 17. This receiver circuit may be traced as follows: From the exploring coil 10, through closed contacts 47, receiver 17, back through the exploring coil 10 and the lineman will therefore know that the ground is located on the left of the exploring coil.

On the other hand, should the ground be located on the conductor 11 at the right side of the exploring coil the lineman will immediately upon the operation of the generator in the clockwise direction receive a tone in his receiver. The tone current would in this case travel over the conductor from the contact member 12 and pass the exploring coil 10 which thus induces a tone in the receiver circuit. In this case as stated, the contacts 31 will be opened, but as contacts 48 are closed the circuit from the generator to contact member 12 will pass through the contacts 48 instead of as formerly through the contacts 31.

Similarly, if the two conductors, of which conductor 11 is one, are short circuited, the position of the short could be located by connecting the other conductor to the terminal 34 so as to provide a complete circuit from the conductor 11 to the other conductor to the generator from terminal 34.

Likewise, if line conductors of two different pairs of which conductor 11 is one, are crossed, the direction of the cross could be located by connecting the other conductor to the terminal 34 in a manner similar to that described for a short circuit.

Thus, it will be seen that in accordance with this invention a very accurate and automatic means is provided for ascertaining the location of a fault by merely operating the generator in one direction or the other and by this means the manually operated switching arrangement, disclosed in the above mentioned copending application, for shifting the application of tone current from one side of the exploring coil to the other is eliminated.

An analysis of the tone produced by this set for locating faults in conductors will now be made with the aid of the wave form patterns shown in Figs. 3, 4 and 5. The alternating current produced by an ordinary generator may be approximately represented by the wave form shown in Fig. 3. It will be noted that in the applicants' device the current produced by the generator through a fault is interrupted at frequent intervals by short circuiting the generator through the brush 46 of the interrupter 16. This short circuit may be traced from the brush 37, through the interrupter 16 and brush 46, contacts 45 and 48 to contacts 31 or through contact 45 to one side of the condenser 23. When this short circuiting takes place the charge on the condenser 23 normally produced by the current from the generator will be discharged through the above mentioned short circuit and thus produce a counter-electromotive force of approximately the same amplitude in the opposite direction from that produced originally by the generator in the conductor resulting in an alternating current of comparatively high frequency and of a value varying in accordance with the rise and fall of the current produced by the generator.

This type of pulsating alternating current of audio frequency possesses the same general characteristics as the current produced by the method disclosed in the above mentioned patent to Anderson, that is, the discharge of the condenser effects instantaneous alternation of current that produces a plurality of sharp peaks approximately as illustrated in the alternating current curves of Fig. 5. The only difference, therefore, between the Anderson and the applicants' current is that in applicants' current these peaks occur at frequent intervals during each half-wave, whereas in the Anderson current only one peak occurs during each half-wave and this peak should occur the moment after the peak of the generator output wave, in order to secure the best effects. This Anderson alternating current wave is illustrated approximately in Fig. 4.

In applicants' device no such accuracy of performance and final adjustment of the relation of the interrupter to the generator to time the discharge is required. All that is required here is that the discharges take place a sufficient number of times during each half-wave and consequently an ordinary interrupter such as is commonly used in the production of ringing current signals in the telephone art may very readily be employed. However, aside from the mechanical advantages of the applicants' device a greater and more important advantage is that the tone produced by this arrangement is more detectable. Perhaps the reason for this is that the sharp discharges of current produce a maximum inductive effect on the exploring coil and occur at frequent intervals. Sounds produced by signals of this character in the receiver are more readily distinguished. Whether or not this theory is correct the results obtained in practice seem to point in this direction. The advantage of using tones that are easily detectable in testing of this kind is apparent. For example, if the resistance due to the fault of the line tested is particularly large, the induced tone will naturally be correspondingly weak, and therefore, these sharp peak current discharges occurring at frequent intervals will to a considerable extent enhance the utility and efficiency of the test set.

What is claimed is:

1. A testing set for locating the direction of unstandard conditions on lines comprising an exploring coil for inductively receiving current from a line under test, means for inductively receiving current induced in said coil, a means for producing a current, and means controlled by said current producing means for rapidly establishing a connection for the transmission of current from said means to a line under test at first one side and then the other side of the exploring coil whereby the direction of an unstandard condition with respect to the position of the detecting device is determined.

2. A testing set for locating the direction of an unstandard condition on a line comprising an exploring coil adapted to be placed in position to inductively receive current from a line under test, means for detecting current induced in said exploring coil, means for producing current, and means controlled by the operation of said current producing means for the establishing of a connection for current from said means to the line under test at one side or the other of the coil whereby the location of the unstandard condition in the line with respect to the position of the coil is determined.

3. A testing set for locating the direction of an unstandard condition on a line comprising an exploring coil adapted to be placed in a position to inductively receive current from a line under test, means for detecting current induced in said exploring coil, two contact members adapted for connection to a line under test, one on one side of the coil and the other on the other side of the coil, a means for producing current, and a switching means controlled by the operation of the current producing means to establish a connection for the transmission of current from said means to one or the other of said contact members whereby the direction of an unstandard condition with respect to the position of the coil is detected.

4. A testing set for locating the direction of unstandard conditions on lines comprising an exploring coil adapted to be placed in position to inductively receive current from a line under test, means for detecting current induced in said coil, a current generator, a means including a switch for establishing a connection for the transmission of current from the generator to the line at one side of the exploring coil responsive to the operation of the generator in one direction and for establishing a connection for the transmission of current from the generator to the line at the other side of the exploring coil responsive to the operation of the generator in the opposite direction whereby the direction of an unstandard condition with respect to the position of the detecting device is determined.

5. A testing set for locating the direction of unstandard conditions on lines comprising an exploring coil for inductively receiving currents from a line under test, means for detecting current induced in said coil, a means for producing alternating current of abruptly changing instantaneous current value, and means controlled by said current producing means for transmitting current from said means to a line under test to one side or the other of the exploring coil, whereby the direction of an unstandard condition with respect to the position of the detecting device is determined.

6. A testing set for locating the direction of unstandard conditions on lines comprising a device for inductively receiving currents from a line under test, means for detecting currents induced in said device, a means for producing an audio-frequency current in which the instantaneous current value of the wave changes abruptly, and means controlled by said current producing means for transmitting current from said means to a line under test to one side or the other of the said device whereby the direction of an unstandard condition with respect to the position of the detecting device is determined.

7. A testing set for locating the direction of unstandard conditions on lines comprising a device adjacent to, but out of electrical contact with, the line under test to inductively receive current induced therefrom, a means for producing an interrupted alternating current, and means controlled by said current producing means for establishing a connection for the transmission of current from said means to a line under test at one side or the other of the said device whereby the direction of an unstandard condition with respect to the position of the detecting device is determined.

8. A testing set for locating the direction of unstandard conditions on lines comprising a device for inductively receiving current from a line under test, means for detecting current induced in said device, a means for producing a current of audio-frequency comprising an alternating current generator, a condenser in circuit therewith, an interrupting device controlled by the generator and connected thereto to short-circuit the generator and to discharge the condenser a certain plurality of times during each alternating current impulse produced by the generator, and means controlled by said current producing means for transmitting current from said current producing means to a line under test to one side or the other of the said device whereby the direction of an unstandard condition with respect to the position of the detecting device is determined.

9. A testing set for locating the direction of unstandard conditions on a line comprising a coil and an indicating device, means for associating said coil with the line to be tested, a hand generator for producing current, and switching means controlled by the operation of the handle of said generator for sending current over said line in one direction or the other depending on the direction in which said handle is turned.

In testimony whereof, we have signed our names to this specification this 6th day of January, 1926.

WILLIAM H. EDWARDS.
ELIOT W. NILES.